US012810163B2

(12) United States Patent
Pope et al.

(10) Patent No.: US 12,810,163 B2
(45) Date of Patent: Nov. 24, 2026

(54) PROPAGATION LATENCY REDUCTION

(71) Applicant: Google LLC, Mountain View, CA (US)

(72) Inventors: Reiner Pope, Mountain View, CA (US); Michial Allen Gunter, Oakland, CA (US)

(73) Assignee: Google LLC, Mountain View, CA (US)

( * ) Notice: Subject to any disclaimer, the term of this patent is extended or adjusted under 35 U.S.C. 154(b) by 1317 days.

(21) Appl. No.: 17/636,662

(22) PCT Filed: Aug. 20, 2020

(86) PCT No.: PCT/US2020/047254
§ 371 (c)(1),
(2) Date: Feb. 18, 2022

(87) PCT Pub. No.: WO2021/035079
PCT Pub. Date: Feb. 25, 2021

(65) Prior Publication Data

US 2022/0318638 A1 Oct. 6, 2022

Related U.S. Application Data

(60) Provisional application No. 62/890,351, filed on Aug. 22, 2019.

(51) Int. Cl.
*G06N 3/088* (2023.01)
*G06F 17/16* (2006.01)

(52) U.S. Cl.
CPC ............. *G06N 3/088* (2013.01); *G06F 17/16* (2013.01)

(58) Field of Classification Search
CPC ........ G06N 3/088; G06N 3/063; G06F 17/16; G06F 9/4881; G06F 9/5027
See application file for complete search history.

(56) References Cited

U.S. PATENT DOCUMENTS

| | | | |
|---|---|---|---|
| 9,501,325 | B2 | 11/2016 | Pell et al. |
| 2017/0249282 | A1 | 8/2017 | Novet |

(Continued)

FOREIGN PATENT DOCUMENTS

| | | |
|---|---|---|
| CN | 102144225 | 8/2011 |
| CN | 103946797 | 7/2014 |

(Continued)

OTHER PUBLICATIONS

Ma, Yufei, et al. 'Performance Modeling for CNN Inference Accelerators on FPGA'. IEEE Transactions on Computer-Aided Design of Integrated Circuits and Systems, vol. 39, No. 4, 2020, pp. 843-856, https://doi.org/10.1109/TCAD.2019.2897634. (Year: 2019).*

(Continued)

*Primary Examiner* — Omar F Fernandez Rivas
(74) *Attorney, Agent, or Firm* — Fish & Richardson P.C.

(57) ABSTRACT

Methods, systems, and apparatus, including computer programs encoded on computer storage media, for scheduling operations to reduce propagation latency between tiles of an accelerator. One of the methods includes receiving a request to generate a schedule for a first layer of a program to be executed by an accelerator configured to perform matrix operations at least partially in parallel, wherein the program defines a plurality of layers including the first layer, each layer of the program defining matrix operations to be performed using a respective matrix of values. A plurality of initial blocks of the schedule are assigned according to an initial assignment direction. The assignment direction is switched starting at a particular cycle so that blocks processed after the selected particular cycle are processed along a different second dimension of the first matrix. All remaining unassigned blocks are then assigned according to the switched assignment direction.

20 Claims, 7 Drawing Sheets

(56) References Cited

U.S. PATENT DOCUMENTS

| | | | | |
|---|---|---|---|---|
| 2017/0344514 | A1 | 11/2017 | Zhou | |
| 2019/0026078 | A1 | 1/2019 | Bannon et al. | |
| 2023/0289601 | A1* | 9/2023 | Park | G06F 13/1673 |

FOREIGN PATENT DOCUMENTS

| | | | | |
|---|---|---|---|---|
| CN | 107168683 A | 9/2017 | | |
| CN | 107454966 | 12/2017 | | |
| CN | 108133270 | 6/2018 | | |
| CN | 108462495 | 8/2018 | | |
| JP | 6279066 | 2/2018 | | |
| JP | 2019079505 | 5/2019 | | |
| KR | 10-2019-0093932 | 8/2019 | | |
| TW | 200707285 | 2/2007 | | |
| TW | I526935 | 3/2016 | | |
| TW | 201923556 | 6/2019 | | |
| WO | WO 2019/078885 | 4/2019 | | |
| WO | WO-2019078885 A1 * | 4/2019 | | G06F 9/5066 |

OTHER PUBLICATIONS

Office Action in Japanese Appln. No. 2021-577625, dated Feb. 13, 2023, 4 pages (with English translation).

Notice of Allowance in Taiwan Appln. No. 111117324, dated May 31, 2023, 7 pages (with English search report).

Office Action in European Appln. No. 20768427.5, dated Jul. 11, 2023, 8 pages.

Office Action in Chinese Appln. No. 202080047574.8, mailed on Sep. 21, 2024, 9 pages (with English translation).

Office Action in Taiwan Appln. No. 112133478, mailed on Aug. 30, 2024, 8 pages (with English translation).

Notice of Allowance in Japanese Appln. No. 2023-126257, mailed on Jul. 16, 2024, 5 pages (with English translation).

Notice of Allowance in Japanese Appln. No. 2021-577625, dated Jul. 3, 2023, 5 pages (with Translation).

International Preliminary Report on Patentability in International Appln. No. PCT/US2020/047254, dated Feb. 17, 2022, 7 pages.

International Search Report and Written Opinion in International Appln. No. PCT/US2020/047254, dated Nov. 18, 2020, 9 pages.

Ma et al., "Performance Modeling for CNN Inference Accelerators on FPGA," IEEE Transactions on Computer-Aided Design of Integrated Circuits and Systems, Apr. 2020, 39(4):843-856.

Office Action in Taiwan Appln. No. 109128654, dated Jun. 7, 2021, 13 pages (with English translation).

Notice of Allowance in Korean Appln. No. 10-2021-7042808, mailed on Feb. 27, 2024, 4 pages (with English translation).

* cited by examiner

PROPAGATION LATENCY REDUCTION

CROSS-REFERENCE TO RELATED APPLICATION

This application is a National Stage Application under 35 U.S.C. § 371 and claims the benefit of International Application No. PCT/US2020/047254, filed Aug. 20, 2020, which claims priority to U.S. Application No. 62/890,351, filed Aug. 22, 2019, the disclosure of which is incorporated herein by reference.

BACKGROUND

This specification relates to machine-learning accelerators.

A machine-learning accelerator is an application-specific integrated circuit (ASIC) that is designed for performing highly parallel synchronous operations. The parallelism is achieved by integrating many different independent processing elements that can execute concurrently.

Such devices are well-suited for accelerating inference passes through neural networks. Neural networks are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Typically the computational operations required for each layer can be achieved by performing matrix multiplications. Often one of the matrices is a vector, e.g., a matrix-by-vector multiplication. Machine-learning accelerators thus allow the multiplies and adds of a matrix multiplication to be performed with high parallelism.

However, there is inherent latency in these computational mechanisms due to the dependencies between the layers of a neural network. The latency arises because the output of one layer becomes input to the next layer. Therefore, the layers of a neural network usually have to be executed sequentially rather than in parallel. In other words, typically the last computational operation of one layer has to complete before the first computation of the next layer can begin.

Two types of latency commonly occur in a machine-learning accelerator that uses multiple tiles assigned to different respective layers. First, computational latency occurs due to components of a chip waiting for input data when they are actually available to perform computations. Second, propagation latency occurs due to the need to propagate the output of one layer computed by one tile to be the input of another layer computed by a second tile. The computational latency can be improved by making a larger device with more compute elements. However, propagation latency tends to increase as devices get larger because the distance the data needs to travel between tiles gets larger as well.

SUMMARY

This specification describes how a system can generate a schedule for a machine learning accelerator that reduces computational latency as well as propagation latency when the between tiles in a machine learning accelerator.

Particular embodiments of the subject matter described in this specification can be implemented so as to realize one or more of the following advantages. The computational latency and propagation latency for a machine learning accelerator can be reduced by modifying the schedule of operations. This results in performance improvements without requiring expensive or complex hardware changes. The performance improvements of the scheduling techniques described below also provide computational advantages when there is only one tile, in which case some schedules may achieve a utilization near 100% despite the existence of inherent computational dependencies.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for scheduling tile operations to reduce the propagation latency between tiles of a multi-tile accelerator, e.g., a machine-learning accelerator.

In this specification, a tile refers to a device having a computational array of cells that can perform computations on a portion of a matrix. Thus, a tile refers to any appropriate accelerator that is configured to perform fixed-size blocks of matrix-vector multiplies. Each cell can includes circuitry that allows the cell to perform mathematical or other computations. In a typical scenario, a tile receives an input vector, uses the computational array to multiply the input vector by a matrix of weights, and generates an output vector.

In this specification, a schedule refers to a time-ordered sequence of portions of a matrix over which a particular tile should operate. In this specification, such discrete portions of a matrix will also be referred to as blocks. Thus, a schedule specifies an ordering of blocks for a particular tile.

Each time the tile operates on a different block of the matrix can be referred to as one iteration of the schedule. If a matrix fits completely within the computational array of a tile, all the matrix operations could be performed without any scheduling. However, when the matrix is larger than the computational array, the system can generate a schedule that specifies in which order different blocks of a matrix should be processed. For convenience, the operations of a schedule in this specification will be referred to as being assigned to specifically identifiable clock cycles. However, these clock cycles need not correspond to actual hardware clock cycles, and the same techniques can be used to assign computations to time periods that include multiple hardware clock cycles.

Figure 1A:
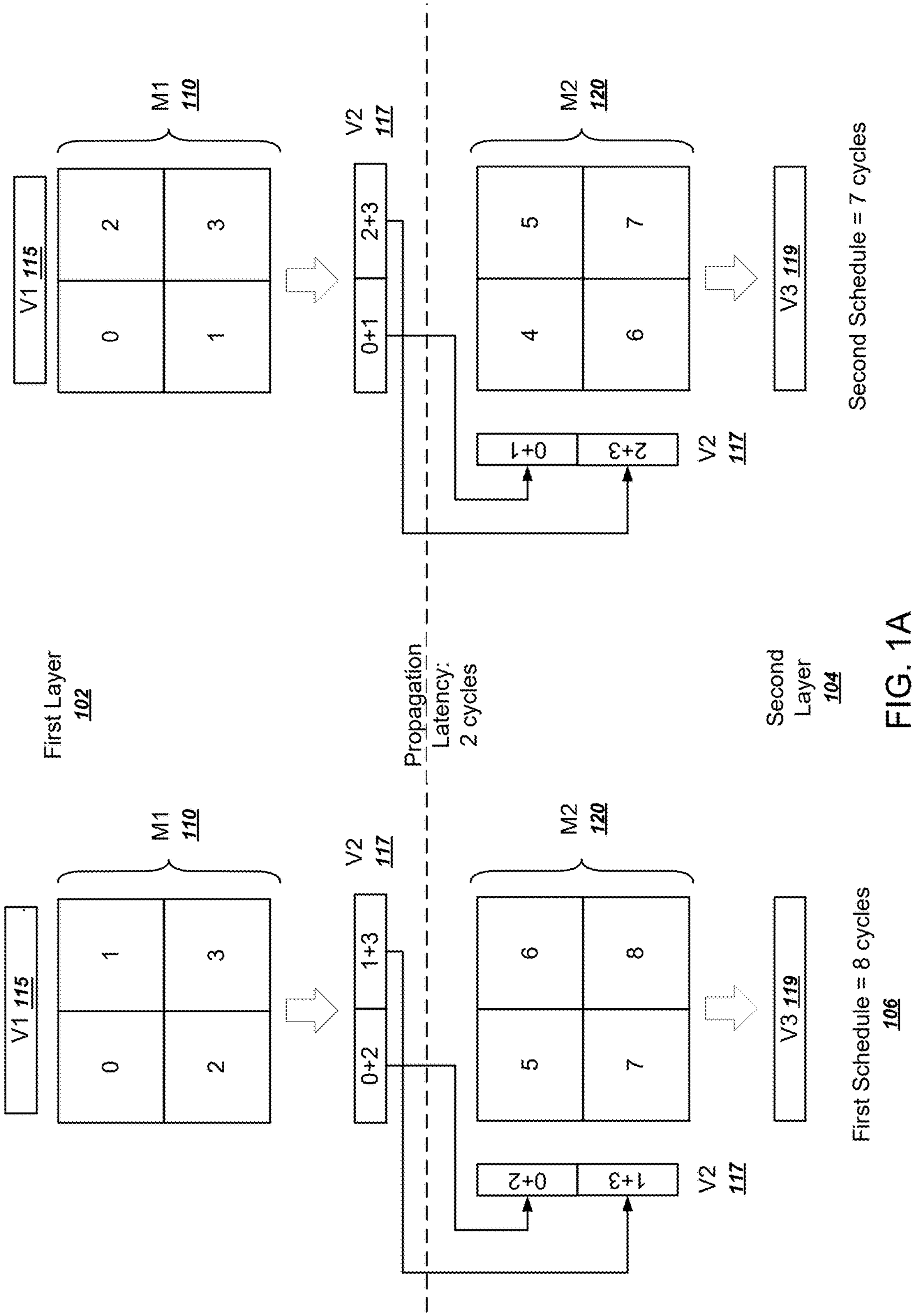
FIG. 1A illustrates how changing the schedule can reduce latency between two layers of a neural network.

FIG. 1A illustrates how changing the schedule can reduce latency between two layers of a neural network. The left-hand side of FIG. 1 illustrates a straightforward schedule in which two tiles are used to perform the operations of two neural network layers. Nevertheless, the straightforward schedule has latency that can be reduced by using an enhanced schedule on the right-hand side of FIG. 1.

A first layer 102 has a first weight matrix M1 110. The operations of the first layer 102 include receiving an input vector V1 115 and multiplying the input vector 115 by the first weight matrix 110 to generate an output vector V2 117.

In this example, the first weight matrix 110 is larger than a computational array of a first tile assigned to perform the operations of the first layer 102. The first weight matrix 110 is twice the width and twice the height of the computational array of the first tile. Therefore, the operations of the first layer have to be performed in multiple blocks over multiple clock cycles according to a particular schedule.

In the example of FIG. 1, the first schedule 106 assigns a row-major schedule to the operations of the first layer 102, meaning that the first tile assigned to the first layer 102 will operate on two iterations over the top half of the first matrix 110 and then operate on two iterations over the bottom half of the first matrix 110. In FIG. 1, clock cycle assignments are illustrated on the corresponding matrix blocks. Thus, for the first matrix 110 according to the first schedule, the first tile will process the top half of the matrix on Cycle 0 and Cycle 1, and the bottom half of the matrix on Cycle 2 and Cycle 3 in that order.

The output vector 117 for the first layer 102 is then generated by summing the partial results of the individual iterations. Thus, a first half of the output vector 117 includes summing the partial results from clock cycles 0 and 2. A second half of the output vector 117 includes summing the partial results from clock cycles 1 and 3.

The output vector 117 is then propagated over communications hardware to a second tile assigned to perform the matrix operations of the second layer 104 having a second weight matrix M2 120. In this example, the propagation latency of the accelerator is assumed to be two clock cycles.

In this diagram, the second layer 104 also has a row-major schedule according to the first schedule 106.

The first tile and the second tile assigned to the first layer 102 and the second layer 104 respectively can perform operations concurrently. However, the computations between layers naturally introduce certain data dependencies, and the propagation latency introduces delays that affect when operations of the second layer 104 can begin.

In particular, the top-left block of the second matrix 120 cannot be executed until both Cycle 0 and Cycle 2 have been executed by the first layer 102. Therefore, after Cycle 2 of the first layer has been executed, Cycles 3 and 4 will be spent propagating the left half of the output vector 117 to the second tile computing the second layer 104. Therefore, the earliest point in time that results for the second layer can be computed is at Cycle 5.

For the same reasons, the bottom-left block of the second matrix 120 of the second layer 104 cannot be executed until both Cycle 1 and Cycle 3 have been executed on the first layer 102 and until the data has been propagated, which incurs two cycles of propagation delay. Because Cycle 6 has already been assigned to the top-right block, the first schedule 106 assigns the bottom-left portion of the second matrix 120 to be processed starting at Cycle 7.

Therefore, FIG. 1A illustrates how the first schedule 106 results in a total execution time of 8 cycles.

The second schedule 108 adjusts the execution order for the first layer 102. Rather than having a row-major ordering, the second schedule 108 assigns a column-major ordering to the first layer 102.

In other words, the first layer can operate first on the top-left portion of the first matrix 110 on Cycle 0, followed by the bottom-left portion of the first matrix 110 on Cycle 1.

Note that at this point, the operations of the second layer 104 can immediately begin processing with the top-left block of the second matrix 120. Thus, after the two-cycle propagation delay on Cycles 2 and 3, the top-left block of the second matrix 120 can already be processed on Cycle 4, and the top-right block of the second matrix 120 can be processed on Cycle 5.

This rearrangement of the row/column ordering of the operations of the first layer 102 reduces the overall execution time of the two layers to 7 cycles. In effect, by changing the row/column ordering in the first layer 102, the system was able to hide one entire cycle of propagation latency between the two tiles assigned to operate on the first and second layers. Although this is a simple example, the time savings was still 12.5% for a single pass through the layers 102 and 104.

This technique can be generalized and refined into a problem of selecting two values: (1) a particular cycle M on which to perform an assignment direction switch, and (2) a particular cycle $T_i$ on which to process the "bottom-left block" of a matrix. In this specification, the "bottom-left" block of the matrix means the last block of a matrix that needs to be processed before the subsequent layer can begin processing outputs generated by the layer. Thus, the "bottom-left" block can be any corner block of the matrix, or any edge block that uses a last-arriving portion of a row or column from the previous layer, depending on the particular arrangement in the schedule.

For an accelerator having N cycles of propagation latency between layer n−1 and layer n, and C cycles of propagation latency between layer n and layer n+1, the system can mitigate the propagation latency by scheduling the bottom-left block of the matrix of layer n to be processed at least N cycles from the beginning of the layer and at least C cycles from the end of the layer.

The enhanced schedule thus makes a switch in assignment direction after the selected cycle M. In general, M specifies a cycle at or before the particular cycle $T_i$. At cycle M, the schedule can switch from assigning blocks in row-major order to column-major order, or vice versa. This is because after the cycle $T_i$, the tile continues receiving data that is sufficient to generate further outputs for the next layer. The techniques described below further describe how to change the row/column assignment direction of a schedule in order to mitigate the latency for matrices of arbitrary size.

The same switch in assignment direction can also reduce latency in a machine learning accelerator having only one tile and little or no propagation latency. For example, suppose that a device included only a single tile that was tasked with computing results for both layers.

Figure 1B:
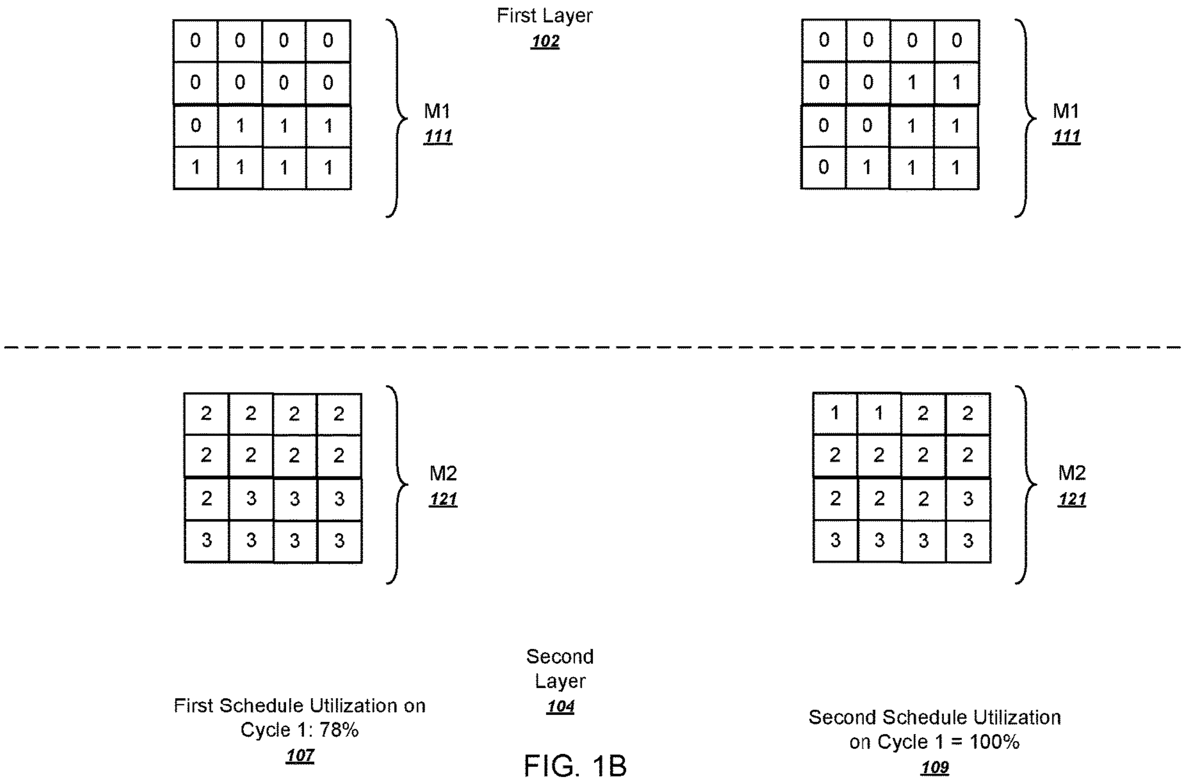
FIG. 1B illustrates scheduling assignments for a single tile.

FIG. 1B illustrates scheduling assignments for a single tile having 9 computational elements processing 4×4 matrices on each of two layers.

The first schedule 107 illustrates basic row-major ordering. One issue that can arise is that some computational elements may have nothing to do because they are waiting on the results of other computations to complete.

On cycle 0, all 9 computational elements are successfully put to work on the first two rows of M1 111 and the first element of the third row of M1 111. But at Cycle 1 in the first schedule 107, only 7 of 9 computational elements can be given work. This is because when using the row-major schedule, the upper-left corner of the second layer cannot be computed until the bottom-right corner of the first layer is processed. Therefore, the first result for the second layer 104 cannot be computed until one cycle later.

Consider instead a second schedule 109 that uses an assignment direction switch. Namely, after assigning the first row of the matrix 111, the system can switch to column major assignment. And thus, the bottom-left block of the matrix 111 is computed on cycle 0 instead of cycle 1. Then, the operations of the second layer can begin immediately on Cycle 1 because the bottom-left block has already been processed on Cycle 0.

The result is that cycle 1 in the second schedule, which had the switch in assignment direction, was able to achieve 100% utilization because some elements of the computational array were able to begin working on the second layer operations without waiting for operations of the first layer to complete. The same techniques can be used to improve the utilization through the layers of a neural network.

Figure 2:
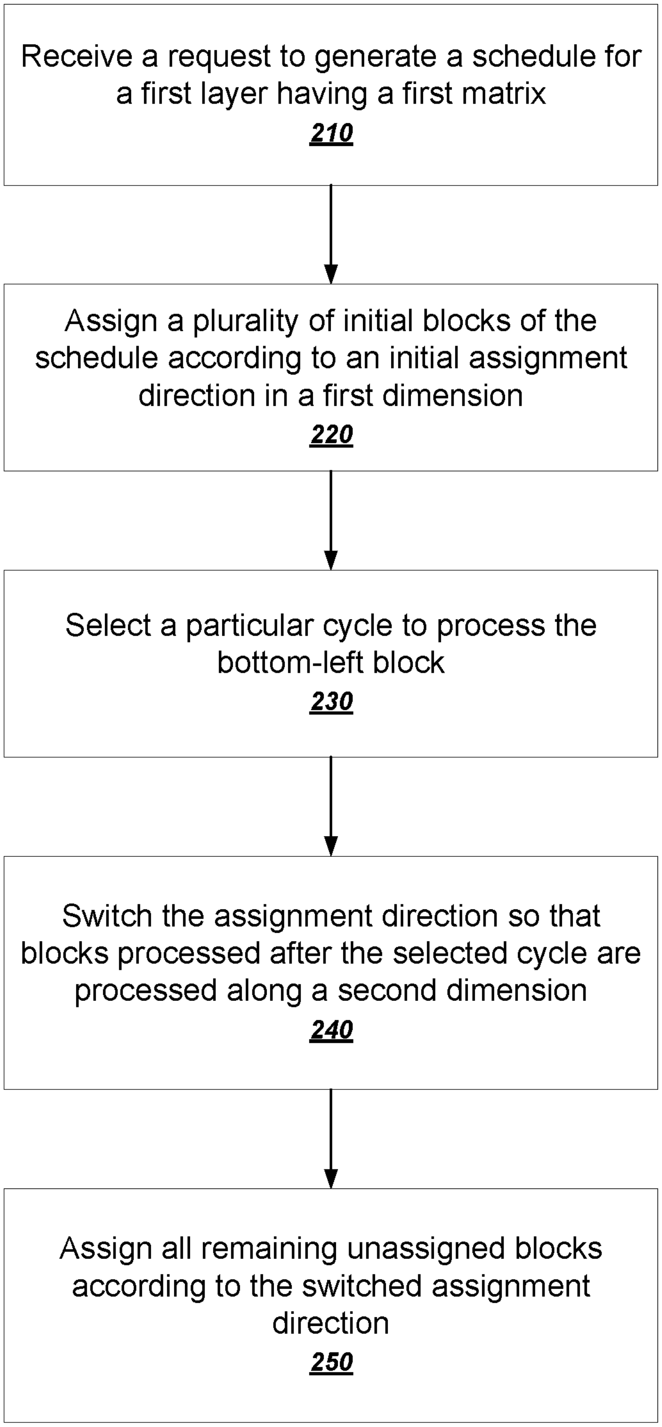
FIG. 2 is a flowchart of an example process for generating a schedule for reducing latency between tiles of an accelerator.

FIG. 2 is a flowchart of an example process for generating a schedule for reducing latency for an accelerator. For convenience, the process will be described as being performed by a system of one or more computers, located in one or more locations, and programmed appropriately in accordance with this specification.

The system receives a request to generate a schedule for a first layer having a first matrix (210). The first layer can be one of multiple layers defined by an input program that specifies the operations to be performed by each of the layers. In a device having multiple tiles, each layer can be assigned to a respective tile of a device having a plurality of tiles. Each layer can have a respective matrix. For example, the input program can specify the operations of a neural network architecture.

The system assigns a plurality of initial blocks of the schedule according to an initial assignment direction in a first dimension (220). The assignment direction specifies a first dimension of the matrix along which iterations of the schedule should be performed. For example, the assignment direction can initially specify row-major ordering or column-major ordering.

The system selects a cycle for the bottom-left block (230). As described above, $T_i$ represents the cycle on which the bottom-left block of the matrix will be executed. Also as described above, the selection of $T_i$ along with a particular type of schedule can also determine M, which is the cycle at which the assignment direction switches.

In general, no matter the choice of $T_i$ cycles of latency can be hidden between layer i−1 and layer i, and $W_i \times H_i - T_i$ cycles of latency can be hidden between layer i and layer i+1. In other words, the system can choose $T_i$ to trade off between hiding latency at the i−1 to i transition versus latency at the i to i+1 transition.

Some matrices may be sufficiently large that the propagation latencies can be completely hidden. Suppose that $L_i$ represents the total end-layer latency, which includes any ending computations or activation functions as well as propagation latency, at the end of layer i. In order to hide all latency for layer i, the following inequality must hold:

$$W_i \times H_i \geq L_{i-1} + L_i,$$

where $W_i$ is the width of the matrix in blocks and $H_i$ is the height of the matrix in blocks. The block sizes can be determined by the tile hardware.

When the condition holds, the system can select $T_i$ to be $L_{i-1}$.

In other words, the system can schedule the blocks so that the bottom-left block executes as soon as possible after the previous layer has finished producing outputs needed to process that block.

However, not all matrices are large enough to completely hide the latencies between layers. In those cases, the schedule can introduce idle cycles in order to force waiting for results to be ready. If a layer i is followed by $S_i$ idle cycles, the following inequality holds for all valid schedules for layer i:

$$W_i \times H_i \geq \max(L_{i-1} - S_{i-1}, 0) + \max(L_i - S_i, 0).$$

If this inequality holds for a valid schedule, the system can assign $T_i$ according to:

$$T_i = \max(L_{i-1} - S_{i-1}, 0).$$

When using this arrangement with idle cycles, the system also programmatically select the number of idle cycles through each layer in order to minimize the total delay introduced by the idle cycles. To do so, the system can perform an optimization procedure to select an integer number of idle cycles Sk for each layer k such that the following inequalities hold:

$$W_i \times H_i - \max(L_i - S_i, o) \geq o$$

and $$S_{i-1} \geq L_{i-1} + \max(L_i - S_i, 0) - W_i \times H_i.$$

The system switches the assignment direction so that the blocks processed after the particular block are processed sequentially along a second dimension (240). The selection of M, the switching cycle, depends on the type of schedule being used. Examples of selecting M are described in more detail below with reference to FIGS. 3A-C.

The system assigns all remaining unassigned blocks according to the switched assignment direction (250). In other words, the system can assign all unscheduled blocks in an ordering according to the second dimension.

Figure 3A:
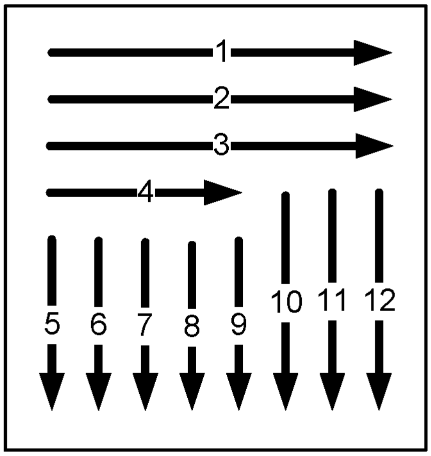
FIG. 3A illustrates performing row-major order and then switching to column-major order.
Figure 3B:
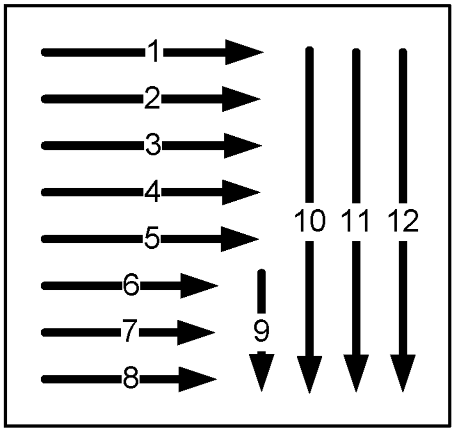
FIG. 3B illustrates performing row-major order with a row limit.
Figure 4:
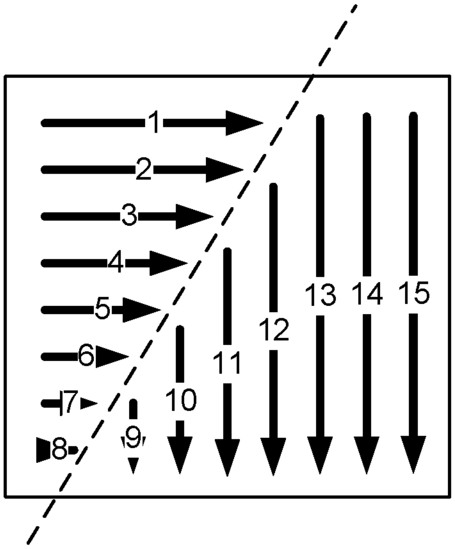
FIG. 4 illustrates diagonal scheduling.

FIGS. 3A-4 illustrate example schedules using a switched assignment direction. In FIGS. 3A-3C, the numbered arrows represent lines of blocks that are assigned to be executed in a particular order.

FIG. 3A illustrates performing row-major order and then switching to column-major order. In other words, the system assigns blocks along the top row to be processed first, then blocks along the second row to be processed second, and so on.

In this example, the cycle M occurs somewhere midway along the fourth row of blocks. The system thus makes a switch in assignment direction and begins assigning blocks in column-major order. The system can do so in order to schedule the bottom-left corner of the matrix to be executed on a selected cycle $T_i$. In other words, the system computes row-major order until the number of untouched rows is equal to the difference between the current cycle and $T_i$.

The schedule illustrated in FIG. 3A results in most of the computation being spent on the column-major phase. This tends to deliver outputs at a very uniform rate and leaves some idle cycles at the end of each column. This can be advantageous for when the outputs for each layer require additional processing, e.g., as is the case for LSTMs.

FIG. 3B illustrates performing row-major order with a row limit. In this example, the row-major phase processes only a limited number of blocks before moving to the next row. In this example schedule, the initial rows include more blocks than the latter rows. In some implementations, the system computes the row limits by computing a value $N=(T_i/H_i-1)$, where $H_i$ is the number of blocks in each column of the matrix. The system can then use the ceiling of N for the initial rows, and the floor of N for the later rows.

The cycle of the bottom-left block $T_i$ in this example is thus given by the two values of N and the number of rows in the matrix. In other words, if there are 8 rows in the matrix and floor(N)=3, and ceiling(N)=4, then $T_i=5\times4+3\times3-(3-1)=27$. The switching cycle M in this case is given by $M=5\times4+3\times3=29$.

The schedule in FIG. 3B eliminates the delays when processing the first few columns and reduces memory requirements. However, the schedule in FIG. 3B can be more complicated to implement.

FIG. 4 illustrates diagonal scheduling. As shown, during the row-major order, each row receives a decreasing number of blocks that is defined by the slope of a diagonal. In this example, the system selects $T_i$ by computing the number of blocks needed to fill the upper-left diagonal, and the system can select $M=T_i$.

The diagonal schedule has symmetry between the row-major and column-major phases, but has disadvantages of both schedules mentioned above.

Figure 5:
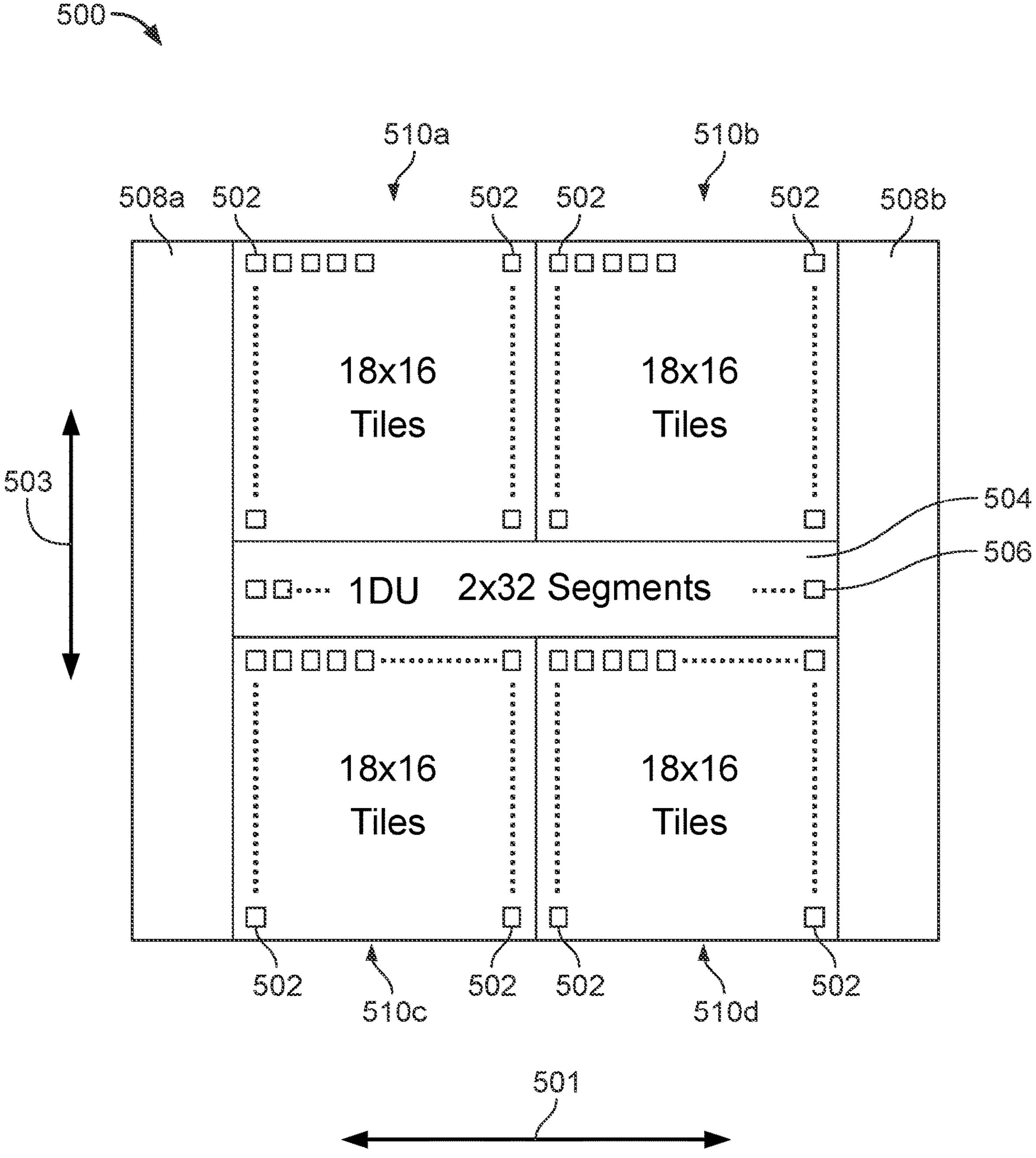
FIG. 5 is a schematic that illustrates an example of special purpose logic circuitry.

FIG. 5 is a schematic that illustrates an example of special purpose logic circuitry, in particular, an ASIC 500. The ASIC 500 includes multiple synchronous processors that for brevity will be referred to as tiles. For example, the ASIC 500 includes tiles 502, in which one or more of the tiles 502 includes special purpose circuitry configured to perform synchronous computations, such as e.g., multiplication and addition operations. In particular, each tile 502 can include a computational array of cells, in which each cell is configured to perform mathematical operations (see, e.g., the exemplary tile 200 shown in FIG. 6, and described herein). In some implementations, the tiles 502 are arranged in a grid pattern, with tiles 502 arranged along a first dimension 501 (e.g., rows) and along a second dimension 503 (e.g., columns). For instance, in the example shown in FIG. 5, the tiles 502 are divided into four different sections (510*a*, 510*b*, 510*c*, 510*d*), each section containing 288 tiles arranged in a grid of 18 tiles down by 16 tiles across. In some implementations, the ASIC 500 shown in FIG. 5 may be understood as including a single systolic array of cells subdivided/arranged into separate tiles, in which each tile includes a subset/sub-array of cells, local memory and bus lines (see, e.g., FIG. 6).

The ASIC 500 also includes a vector processing unit 504. The vector processing unit 504 includes circuitry configured to receive outputs from the tiles 502 and compute vector computation output values based on the outputs received from the tiles 502. For example, in some implementations, the vector processing unit 504 includes circuitry (e.g., multiply circuitry, adder circuitry, shifters, and/or memory) configured to perform accumulation operations on the outputs received from the tiles 502. Alternatively, or in addition, the vector processing unit 504 includes circuitry configured to apply a non-linear function to the outputs of the tiles 502. Alternatively, or in addition, the vector processing unit 504 generates normalized values, pooled values, or both. The vector computation outputs of the vector processing units can be stored in one or more tiles. For example, the vector computation outputs can be stored in memory uniquely associated with a tile 502. Alternatively, or in addition, the vector computation outputs of the vector processing unit 504 can be transferred to a circuit external to the ASIC 500, e.g., as an output of a computation. In some implementations, the vector processing unit 504 is segmented, such that each segment includes circuitry configured to receive outputs from a corresponding collection of tiles 502 and computes vector computation outputs based on the received outputs. For instance, in the example shown in FIG. 5, the vector processing unit 504 includes two rows spanning along the first dimension 501, each of the rows including 32 segments 506 arranged in 32 columns. Each segment 506 includes circuitry (e.g., multiply circuitry, adder circuitry, shifters, and/or memory) configured to perform a vector computation, as explained herein, based on outputs (e.g., an accumulated sum) from a corresponding column of tiles 502. The vector processing unit 504 can be positioned in the middle of the grid of tiles 502 as shown in FIG. 5. Other positional arrangements of the vector processing unit 504 are also possible.

The ASIC 500 also includes a communication interface 508 (e.g., interfaces 508*a*, 508*b*). The communication interface 508 includes one or more sets of serializer/deserializer (SerDes) interfaces and a general purpose input/output (GPIO) interface. The SerDes interface is configured to receive instructions (e.g., instructions for operating controllable bus lines described below) and/or input data for the ASIC 500 and to output data from the ASIC 500 to an external circuit. For example, the SerDes interface can be configured to transmit instructions and/or input data at a rate of 32 Gbps, 56 Gbps, or any suitable data rate over the set of SerDes interfaces included within the communications interface 508. The GPIO interface is configured to provide an interface for debugging and/or bootstrapping. For example, the ASIC 500 may run a boot program when it is turned on. If the program fails, an administrator may use the GPIO interface to debug the source of the failure.

The ASIC 500 further includes multiple controllable bus lines (see, e.g., FIG. 6) configured to convey data among the communications interface 508, the vector processing unit 504, and the multiple tiles 502. Controllable bus lines include, e.g., wires that extend along both the first dimension 501 (e.g., rows) of the grid and the second dimension 503 (e.g., columns) of the grid. A first subset of the controllable bus lines extending along the first dimension 501 can be configured to transfer data in a first direction (e.g., to the right of FIG. 5). A second subset of the controllable bus lines extending along the first dimension 501 can be configured to transfer data in a second direction (e.g., to the left of FIG. 5). A first subset of the controllable bus lines extending along the second dimension 503 can be configured to transfer data in a third direction (e.g. to the top of FIG. 5). A second subset of the controllable bus lines extending along the second dimension 503 can be configured to transfer data in a fourth direction (e.g., to the bottom of FIG. 5).

Each controllable bus line includes multiple conveyer elements, such as flip-flops, that are used to convey data along the lines in accordance with a clock signal. Transferring data over a controllable bus line can include shifting, at each clock cycle, data from a first conveyer element of the controllable bus line to a second adjacent conveyer element of the controllable bus line. In some implementations, data is conveyed over the controllable bus lines upon the rising or falling edge of a clock cycle. For example, data present, at a first clock cycle, on a first conveyer element (e.g., a flip-flop) of a controllable bus line can be transferred to a second conveyer element (e.g., a flip-flop) of the controllable bus line at a second clock cycle. In some implementations, the conveyer elements can be periodically spaced apart at a fixed distance from one another. For example, in some cases, each controllable bus line includes multiple conveyer elements, with each conveyer element positioned within or proximate to a corresponding tile 502.

Each controllable bus line also includes multiple multiplexers and/or demultiplexers. A multiplexer/demultiplexer of a controllable bus line is configured to transfer data between the bus line and a component of the ASIC chip 500. For example, a multiplexer/demultiplexer of a controllable bus line can be configured to transfer data to and/or from a tile 502, to and/or from the vector processing unit 504, or to and/or from the communication interface 508. Transferring data among tiles 502, the vector processing unit 504, and the communication interface can include sending control signals to the multiplexers based on the desired data transfer to take place. The control signals can be stored in registers coupled directly to the multiplexer and/or demultiplexers. The value of the control signal then may determine, e.g., what data is transferred from a source (e.g., memory within a tile 502 or a vector processing unit 504) to a controllable bus line or, alternatively, what data is transferred from the controllable bus line to a sink (e.g., memory within a tile 502 or a vector processing unit 504).

The controllable bus lines are configured to be controlled on a local level, such that each tile, vector processing unit, and/or communication interface includes its own set of control elements for manipulating the controllable bus lines passing through that tile, vector processing unit, and/or communication interface. For example, each tile, 1D vector processing unit, and communication interface may include a corresponding set of conveyer elements, multiplexers and/or demultiplexers for controlling data transfer to and from that tile, 1D vector processing unit, and communication interface.

To minimize latency associated with operations of the ASIC chip 500, the tiles 502 and vector processing unit 504 can be positioned to reduce the distance data travels among the various components. In a particular implementation, both the tiles 502 and communication interface 508 can be segregated into multiple sections, with both the tile sections and the communication interface sections being arranged such that the maximum distance data travels between a tile and a communication interface is reduced. For instance, in some implementations, a first group of tiles 502 can be arranged in a first section on a first side of the communications interface 508, and a second group of tiles 502 can be arranged in a second section on a second side of the communication interface. As a result, the distance from a communication interface to the furthest tile may be cut in half compared to a configuration in which all of the tiles 502 are arranged in a single section on one side of the communication interface.

Alternatively, the tiles may be arranged in a different number of sections, such as four sections. For instance, in the example shown in FIG. 5, the multiple tiles 502 of ASIC 500 are arranged in multiple sections 510 (510*a*, 510*b*, 510*c*, 510*d*). Each section 510 includes a similar number of tiles 502 arranged in a grid pattern (e.g., each section 510 can include 256 tiles arranged in 16 rows and 16 columns). The communication interface 508 also is divided into multiple sections: a first communication interface 508*a* and a second communication interface 508*b* arranged on either side of the sections 510 of tiles 502. The first communication interface 508*a* can be coupled, through controllable bus lines, to the two tile sections 510*a*, 510*c* on the left side of the ASIC chip 500. The second communication interface 508*b* can be coupled, through controllable bus lines, to the two tile sections 510*b*, 510*d* on the right side of the ASIC chip 500. As a result, the maximum distance data travels (and thus the latency associated with the data propagation) to and/or from a communication interface 508 can be halved compared to an arrangement in which only a single communication interface is available. Other coupling arrangements of the tiles 502 and communication interfaces 508 are also possible to reduce data latency. The coupling arrangement of the tiles 502 and communication interface 508 can be programmed by providing control signals to the conveyer elements and multiplexers of the controllable bus lines.

In some implementations, one or more tiles 502 are configured to initiate reading and writing operations with respect to controllable bus lines and/or other tiles within the ASIC 500 (referred to herein as "control tiles"). The remaining tiles within the ASIC 500 can be configured to perform computations based on the input data (e.g., to compute layer inferences). In some implementations, the control tiles include the same components and configuration as the other tiles within the ASIC 500. The control tiles can be added as an extra tile or tiles, an extra row or rows, or an extra column or columns of the ASIC 500. For example, for a symmetric grid of tiles 502, in which each tile 502 is configured to perform a computation on input data, one or more additional rows of control tiles can be included to handle reading and writing operations for the tiles 502 performing computations on the input data. For instance, each section 510 includes 18 rows of tiles, where the last two rows of tiles may include control tiles. Providing separate control tiles increases, in some implementations, the amount of memory available in the other tiles used to perform the computations. Separate tiles dedicated to providing control as described herein are not necessary, however, and in some cases, no separate control tiles are provided. Rather, each tile may store in its local memory instructions for initiating reading and writing operations for that tile.

Furthermore, while each section 510 shown in FIG. 5 includes tiles arranged in 18 rows by 16 columns, the number of tiles 502 and their arrangement in a section can be different. For example, in some cases, the sections 510 may include an equal number of rows and columns.

Furthermore, although shown in FIG. 5 as divided into four sections, the tiles 502 can be divided into other different groupings. For example, in some implementations, the tiles 502 are grouped into two different sections, such as a first section above the vector processing unit 504 (e.g., nearer the top of the page shown in FIG. 5) and a second section below the vector processing unit 504 (e.g., nearer to the bottom of the page shown in FIG. 5). In such an arrangement, each section may contain, e.g., 576 tiles arranged in a grid of 18 tiles down (along direction 503) by 32 tiles across (along direction 501). Sections may contain other total numbers of tiles and may be arranged in different sized arrays. In some cases, the divisions between sections are delineated by hardware features of the ASIC 500. For example, as shown in FIG. 5, sections 510*a*, 510*b* may be separated from sections 510*c*, 510*d* by the vector processing unit 504.

Latency also may be reduced by centrally locating the vector processing unit 504 relative to the tile sections 510. In some implementations, a first half of the tiles 502 are arranged on a first side of the vector processing unit 504, and a second half of the tiles 502 are arranged on a second side of the vector processing unit 504.

For example, in the ASIC chip 500 shown in FIG. 5, the vector processing unit 504 includes two sections (e.g., two rows), each of which includes a number of segments 506 that matches the number of columns of tiles 502. Each segment 506 can be positioned and configured to receive an output, such as an accumulated sum, from a corresponding column of tiles 502 within a section 510 of tiles. In the example shown in FIG. 5, the tile sections 510*a*, 510*b* positioned on a first side of the vector processing unit 504 (e.g., above the vector processing unit 504) can be coupled, through controllable bus lines, to the top row of segments 506. The tile sections 510*c*, 510*d* positioned on a second side of the vector processing unit 504 (e.g., below the vector processing unit 504) can be coupled, through controllable bus lines, to the bottom row of segments 506. Furthermore, each tile 502 within the first half above the processing unit 504 can be positioned at a same distance from the vector processing unit 504 as a respective tile 502 within the second half below the processing unit 504, such that there is no difference in overall latency between the two halves. For instance, the tiles 502 in row i in the first section 510*a* (where the variable i corresponds to the row position) can be positioned at the same distance away from vector processing unit 504 as the tiles 502 in row m-1-*i* in a second section of tiles (e.g., the section 510*c*) (where m represents the total number of rows in each section, and assuming rows are incremented along the same direction in both sections).

Configuring the tile sections 510 in this manner can halve the distance data travels (and thus the latency associated with the data propagation) to and/or from the vector processing unit 504 compared to an arrangement in which the vector processing unit 504 is positioned at a far end (e.g., the bottom) of all the tiles 502. For instance, the latency associated with receiving an accumulated sum through a column of tiles 502 from section 510*a* can be half the latency associated with receiving an accumulated sum through a column of tiles 502 from sections 510*a* and 510*c*. The coupling arrangements of the tiles 502 and the vector processing unit 504 can be programmed by providing control signals to the conveyer elements and multiplexers of the controllable bus lines.

During operation of the ASIC chip 500, activation inputs may be shifted between tiles. For example, activation inputs can be shifted along the first dimension 501. In addition, outputs from computations performed by the tiles 502 (e.g., outputs of computations performed by computational array within the tile 502) can be shifted along the second dimension 503 between tiles.

In some implementations, the controllable bus lines can be physically hardwired to cause data to skip tiles 502 to reduce latency associated with the operations of the ASIC chip 500. For example, an output of a computation performed by a first tile 502 can be shifted along the second dimension 503 of the grid to a second tile 502 positioned at least one tile away from the first tile 502, thus skipping the tile in between. In another example, an activation input from a first tile 502 can be shifted along the first dimension 501 of the grid to a second tile 502 positioned at least one tile away from the first tile 502, thus skipping the tile in between. By skipping at least one tile when shifting the activation input or the output data, the overall data path length can be reduced, such that the data is transferred faster (e.g., there is no need to utilize a clock cycle to store data at the skipped tile), and latency is reduced.

In an example implementation, each tile 502 within each column of section 510*a* can be configured, through the controllable bus lines, to pass output data along the second dimension 503 toward the vector processing unit 504. The tiles 502 within each column can be further configured to pass the data toward the vector processing unit 504 by skipping the next adjacent tile (e.g., through physical hardwiring of the controllable bus lines between tiles). That is, a tile 502 at a position (i, j)=(0, 0) in the first section 510*a* (where the variable i corresponds to the row position and the variable j corresponds to the column position) can be hardwired to pass output data to a tile 502 at a position (i, j)=(2, 0); similarly, the tile 502 at a position (i, j)=(2, 0) in the first section 510*a* can be hardwired to pass output data to a tile 502 at a position (i, j)=(4, 0), and so forth. The last tile that is not skipped (e.g., the tile 502 located at position (i, j)=(16, 0)) passes output data to the vector processing unit 504. For a section 510 having 18 rows of tiles, such as the example shown in FIG. 5, the tile skipping ensure that all tiles within a section 510 are at most 9 “tile hops” away from the vector processing unit 504, thus improving the ASIC chip 500 performance by reducing the data path length and resulting data latency by half.

In another example implementation, each tile 502 within each row of sections 510*a*, 510*c* and within each row of sections 510*b*, 510*d* can be configured, through the controllable bus lines, to pass activation inputs along the first dimension 501. For example, some tiles within the sections 510*a*, 510*b*, 510*c*, 510*d* can be configured to pass activation inputs toward a center of the grid 500 or toward the communication interfaces 508. The tiles 502 within each row can be further configured skip adjacent tiles, e.g., by hardwiring the controllable bus lines between tiles. For example, a tile 502 at a position (i, j)=(0, 0) in the first section 510*a* (where the variable i corresponds to the row position and the variable j corresponds to the column position) can be configured to pass activation inputs to a tile 502 at a position (i, j)=(0, 2); similarly, a tile 502 at a position (i, j)=(0, 2) in the first section 510*a* can be configured to pass activation inputs to a tile 502 at a position (i, j)=(0, 4), and so forth. In some cases, the last tile that is not skipped (e.g., the tile 502 located at position (i, j)=(0, 14)) does not pass the activation input on to another tile.

Similarly, tiles that are skipped may pass activation inputs in the opposite direction. For example, a tile 502 at a position (i, j)=(0, 15) in the first section 510*a* (where the variable i corresponds to the row position and the variable j corresponds to the column position) can be configured to activation inputs to a tile 502 at a position (i, j)=(0, 13); similarly, a tile 502 at a position (i, j)=(0, 13) in the first section 510*a* can be configured to pass activation inputs to a tile 502 at a position (i, j)=(0, 11), and so forth. In some cases, the last tile that is not skipped (e.g., the tile 502 located at position (i, j)=(0, 1)) does not pass the activation input on to another tile. By skipping tiles, it is possible, in some implementations, to improve the ASIC chip 500 performance by reducing the data path length and resulting data latency by half.

As explained herein, in some implementations, one or more of the tiles 502 are dedicated to storing control information. That is, the tiles 502 dedicated to storing control information do not take part in performing calculations on input data such as weight inputs and activation inputs. Control information can include, e.g., control data for configuring the controllable bus lines during operation of the ASIC chip 500 so that data can be moved around the ASIC chip 500. The control data can be provided to the controllable bus lines in the form of control signals for controlling the conveyer elements and multiplexers of the controllable bus lines. The control data specifies whether particular conveyer elements of the controllable bus lines pass data to a next conveyer element of the controllable bus line so that data is transferred among the tiles according to a predetermined schedule. The control data additionally specifies whether data is transferred from or to a bus line. For example, the control data can include control signals that direct a multiplexer to transfer data from a bus line to memory and/or other circuitry within a tile. In another example, the control data can include control signals that direct a multiplexer to transfer data from the memory and/or circuitry within the tile to the bus line. In another example, the control data can include control signals that direct a multiplexer to transfer data between a bus line and the communications interface 508 and/or between the bus line and the vector processing unit 504. Alternatively, as disclosed herein, dedicated control tiles are not used. Rather, in such cases, the local memory of each tile stores the control information for that particular tile.

Figure 6:
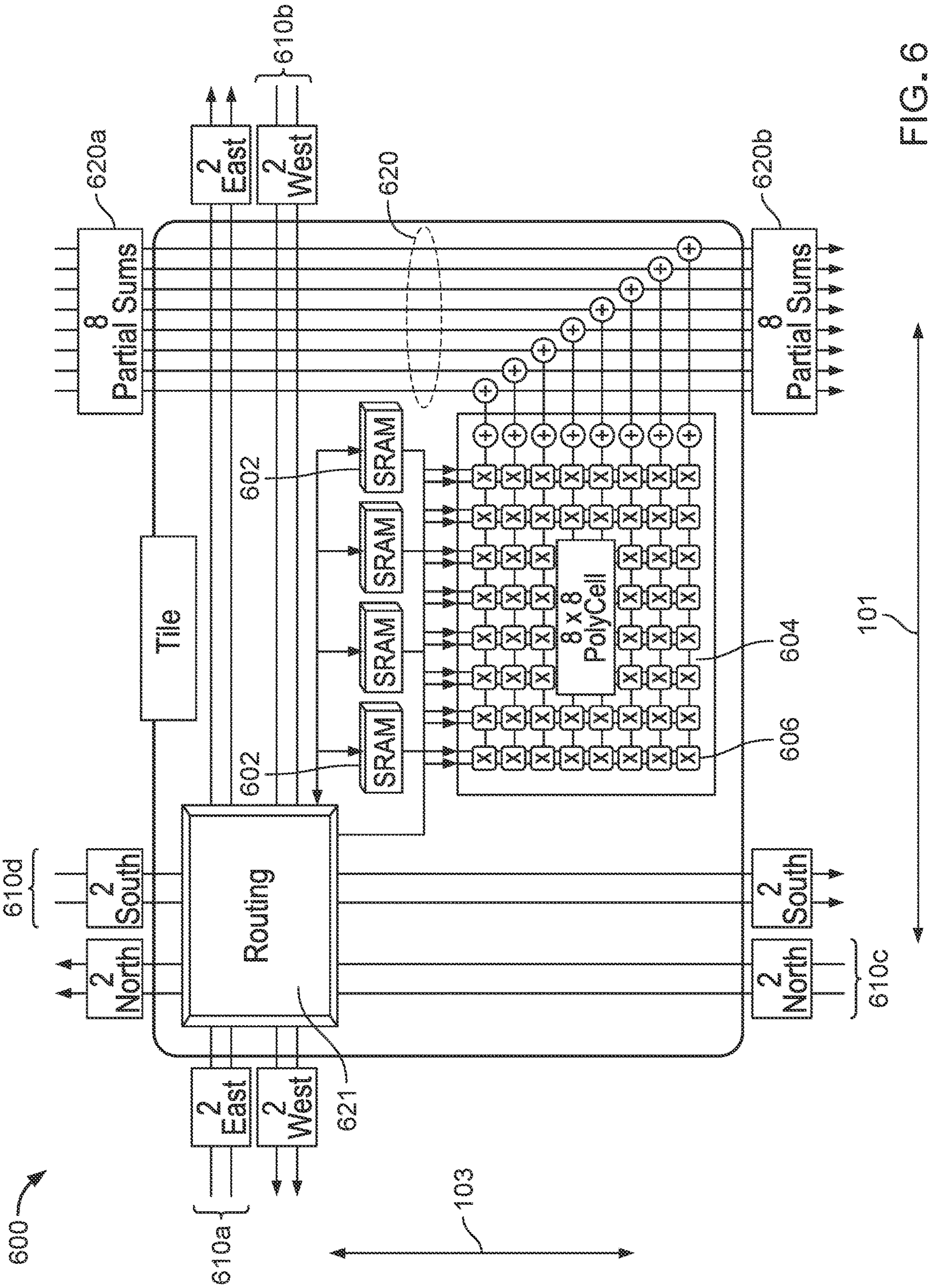
FIG. 6 illustrates example of a tile for use in the ASIC chip.

FIG. 6 illustrates example of a tile 600 for use in the ASIC chip 500. Each tile 600 includes local memory 602 and a computational array 604 coupled to the memory 602. The local memory 602 includes physical memory positioned proximate to the computational array 604. The computational array 604 includes multiple cells 606. Each cell 606 of the computational array 604 includes circuitry configured to perform a computation (e.g., a multiply and accumulate operation) based on data inputs, such as activation inputs and weight inputs, to the cell 606. Each cell can perform the computation (e.g., the multiply and accumulation operation) on a cycle of the clock signal. The computational array 604 can have more rows than columns, more columns than rows, or an equal number of columns and rows. For instance, in the example shown in FIG. 6, the computational array 604 includes 64 cells arranged in 8 rows and 8 columns. Other computational array sizes are also possible, such as computational arrays having 16 cells, 32 cells, 128 cells, or 256 cells, among others. Each tile can include the same number of cells and/or the same size computational array. The total number of operations that can be performed in parallel for the ASIC chip then depends on the total number of tiles having the same size computational array within the chip. For example, for the ASIC chip 500 shown in FIG. 5, which contains approximately 1150 tiles, this means that approximately 72,000 computations can be performed in parallel every cycle. Examples of clock speeds that may be used include, but are not limited to, 225 MHz, 500 MHz, 750 MHz, 1 GHz, 1.25 GHz, 1.5 GHz, 1.75 GHz, or 2 GHz. The computational arrays 604 of each individual tile is a subset of the larger systolic array of tiles, as illustrated in FIG. 1.

The memory 602 contained in the tile 600 can include, e.g., random-access memory (RAM), such as SRAM. Each memory 602 can be configured to store $(1/n)^{th}$ of the total memory associated with n tiles 502 of the ASIC chip illustrated in FIG. 5. The memory 602 can provided as a single chip or in multiple chips. For example, memory 602 shown in FIG. 6 is provided as four single-port SRAMs, each of which is coupled to the computational array 604. Alternatively, the memory 602 can be provided as two single-port SRAMs or eight single-port SRAMS, among other configurations. The joint capacity of the memory can be, but is not limited to, e.g., 16 kB, 32 kB, 64 kB, or 128 kB, after error correction coding. By providing the physical memory 602 locally to the computational arrays, the density of wiring for the ASIC 500 can be, in some implementations, vastly reduced. In an alternate configuration in which memory is centralized within the ASIC 500, as opposed to provided locally as described herein, may require a wire for each bit of memory bandwidth. The total number of wires needed to cover each tile of the ASIC 500 would far exceed the available space within the ASIC 100. In contrast, with dedicated memory provided for each tile, the total number of required to span the area of the ASIC 500 can be substantially reduced.

The tile 600 also includes controllable bus lines. The controllable bus lines may be categorized into multiple different groups. For example, the controllable bus lines can include a first group of general purpose controllable bus lines 610 configured to transfer data among tiles in each cardinal direction. That is, the first group of controllable bus lines 610 can include: bus lines **610*a* configured to transfer data toward a first direction along the first dimension 501 of the grid of tiles (referred to as "East" in FIG. 6); bus lines 610*b* configured to transfer data toward a second direction along the first dimension 101 of the grid of tiles (referred to as "West" in FIG. 6), in which the second direction is opposite to that of the first direction; bus lines 610*c* configured to transfer data toward a third direction along the second dimension 103 of the grid of tiles (referred to as "North" in FIG. 6); and bus lines 610*d* configured to transfer data toward a fourth direction along the second dimension 103 of the grid of tiles (referred to as "South" in FIG. 6), in which the fourth direction is opposite to the third direction. General purpose bus lines 610 can be configured to carry control data, activation input data, data from and/or to the communications interface, data from and/or to the vector processing unit, and data to be stored and/or used by the tile 600 (e.g., weight inputs). The tile 600 may include one or more control elements 621 (e.g., flip-flops and multiplexers) for controlling the controllable bus lines, and thus routing data to and/or from the tile 600 and/or from memory 602**.

The controllable bus lines also can include a second group of controllable bus lines, referred to herein as computational array partial sum bus lines 620. The computational array partial sum bus lines 620 can be configured to carry data output from computations performed by the computational array 604. For example, the bus lines 620 can be configured to carry partial sum data obtained from the rows in the computational array 604, as shown in FIG. 6. In such case, the number of bus lines 620 would match the number of rows in the array 604. For instance, for a 8×8 computational array, there would be 8 partial sum bus lines 620, each of which is coupled to the output of a corresponding row in the computational array 604. The computational array output bus lines 620 can be further configured to couple to another tile within the ASIC chip, e.g., as inputs to a computational array of another tile within the ASIC chip. For example, the array partial sum bus lines 620 of tile 600 can be configured to receive inputs (e.g., partial sums **620*a*) of a computational array of a second tile that is located at least one tile away from the tile 600. The outputs of computational array 604 then are added to the partial sum lines 620 to produce new partial sums 620*b*, which may be output from the tile 600. The partial sums 620*b* then may be passed to another tile or, alternatively, to the vector processing unit. For example, each bus line 620 may be coupled to a corresponding segment (such as segments 506 in FIG. 5**) of the vector processing unit.

As explained with respect to FIG. 5, the controllable bus lines can include circuitry such as conveyer elements (e.g., flip-flops) configured to allow data to be conveyed along the bus lines. In some implementations, each controllable bus line includes, for each tile, a corresponding conveyer element. As further explained with respect to FIG. 5, the controllable bus lines can include circuitry such as multiplexers configured to allow data to be transferred among the different tiles, the vector processing unit and the communications interface of the ASIC chip. The multiplexers can be located wherever there is a source or sink for data. For example, in some implementations, as shown in FIG. 6, control circuitry 621, such as multiplexers, can be located at crossings of controllable bus line (e.g., at the crossing of general purpose bus lines 610$a$ and 610$d$, at the crossing of general purpose bus lines 610$a$ and 610$c$, at the crossing of general purpose bus lines 610$b$ and 610$d$, and/or at the crossing of general purpose bus lines 610$b$ and 610$c$). The multiplexers at the bus line crossings can be configured to transfer data between the bus lines at the crossings. Accordingly, by proper operation of the multiplexers, it can be possible to change the direction in which data travels over the controllable bus lines. For example, data traveling along the first dimension 101 on general purpose bus lines 610$a$ can be transferred to general purpose bus lines 610$d$, such that the data instead travels along the second dimension 103. In some implementations, multiplexers can be located adjacent to the memory 602 of the tile 600 so that data can be transferred to and/or from memory 602.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

receiving a request to generate a schedule for a first layer of a program to be executed by an accelerator configured to perform matrix operations at least partially in parallel, wherein the program defines a plurality of layers including the first layer, each layer of the program defining matrix operations to be performed using a respective matrix of values;

- assigning a plurality of initial blocks of the schedule according to an initial assignment direction, wherein the initial assignment direction specifies a first dimension of a first matrix for the first layer along which the plurality of initial blocks are to be performed;
- selecting a particular cycle to process a last block of a matrix needed before a subsequent layer can begin processing;
- switching the assignment direction so that blocks processed after the selected particular cycle are processed along a different second dimension of the first matrix; and
- assigning all remaining unassigned blocks according to the switched assignment direction.

Embodiment 2 is the method of embodiment 1, wherein selecting the particular cycle comprises:

- computing the propagation latency of a previous layer; and
- assigning the particular cycle based on the propagation latency of the previous layer.

Embodiment 3 is the method of any one of embodiments 1-2, wherein selecting the particular cycle comprises:

- computing the propagation latency of a previous layer;
- computing a number of idle cycles of the previous layer; and
- selecting a maximum between the propagation latency of the previous layer and the number of idle cycles of the previous layer.

Embodiment 4 is the method of any one of embodiments 1-3, wherein the schedule assigns the plurality of initial blocks in row-major order, and wherein assigning all remaining unassigned blocks assigns blocks in column-major order.

Embodiment 5 is the method of embodiment 4, further comprising selecting a cycle at which to switch the assignment direction including selecting a cycle at which a number of unscheduled rows is equal to a difference between a current cycle and the selected particular cycle.

Embodiment 6 is the method of embodiment 4, wherein the schedule assigns the plurality of initial blocks along only partial rows of the matrix.

Embodiment 7 is the method of embodiment 6, wherein the schedule assigns a plurality of initial partial rows and a plurality of subsequent partial rows, wherein the subsequent partial rows are smaller than the initial partial rows.

Embodiment 8 is the method of embodiment 7, wherein the initial partial rows have a length given by ceiling(N), and the subsequent partial rows have a length given by floor(N), where N is given by the selected cycle divided by the block height of a matrix on a previous layer.

Embodiment 9 is the method of embodiment 4, wherein the schedule assigns the initial blocks in the row-major order to fill a space defined by a diagonal in the matrix. Embodiment 10 is the method of embodiment 9, wherein switching the assignment direction occurs at the particular selected cycle.

Embodiment 11 is the method of any one of embodiments 1-10, wherein the accelerator has multiple tiles and each layer is to be computed by a respective tile of the multiple tiles.

Embodiment 12 is the method of any one of embodiments 1-10, wherein the accelerator has a single tile to perform operations of both layers.

Embodiment 13 is a system comprising: one or more computers and one or more storage devices storing instructions that are operable, when executed by the one or more computers, to cause the one or more computers to perform the method of any one of embodiments 1 to 64.

Embodiment 14 is a computer storage medium encoded with a computer program, the program comprising instructions that are operable, when executed by data processing apparatus, to cause the data processing apparatus to perform the method of any one of embodiments 1 to 64.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:

receiving a request to generate a schedule for a first layer of a program to be executed by an accelerator configured to perform matrix operations at least partially in parallel, wherein the program defines a plurality of layers including the first layer, each layer of the program defining matrix operations to be performed using a respective matrix of values;

assigning a plurality of initial blocks to the schedule according to an initial assignment direction, wherein the initial assignment direction in a row-major ordering or a column-major ordering specifies a first dimension of a first matrix for the first layer along which the plurality of initial blocks are to be performed;

selecting a particular cycle to process a last block of a matrix needed before a subsequent layer can begin processing;

switching the assignment direction from the row-major ordering to the column-major ordering, the switched assignment direction specifying a second dimension of the first matrix different to the first dimension so that any remaining unassigned blocks of the matrix that are processed after the selected particular cycle are processed along the different second dimension of the first matrix;

assigning to the schedule the remaining unassigned blocks according to the switched assignment direction; and sending the generated schedule to the accelerator for performing operations for processing the blocks of the first matrix of the current layer according to the generated schedule.

2. The method of claim 1, wherein selecting the particular cycle comprises:

computing the propagation latency of a previous layer, where the propagation latency is related to a number of cycles before a previous layer produces an output for use by the first layer in processing the last block; and assigning the particular cycle to the schedule of processing the last block of the plurality of initial blocks of the first matrix based on the propagation latency of the previous layer.

3. The method of claim 1, wherein selecting the particular cycle comprises:

computing the propagation latency of a previous layer;

computing a number of idle cycles of the previous layer; and selecting a maximum between the propagation latency of the previous layer and the number of idle cycles of the previous layer.

4. The method of claim 1, wherein the schedule assigns the plurality of initial blocks in row-major order, and wherein assigning all remaining unassigned blocks assigns blocks in column-major order.

5. The method of claim 4, further comprising selecting a cycle at which to switch the assignment direction including selecting a cycle at which a number of unscheduled rows is equal to a difference between a current cycle and the selected particular cycle.

6. The method of claim 4, wherein the schedule assigns the plurality of initial blocks along only partial rows of the matrix.

7. The method of claim 6, wherein the schedule assigns a plurality of initial partial rows and a plurality of subsequent partial rows, wherein the subsequent partial rows are smaller than the initial partial rows.

8. The method of claim 7, wherein the initial partial rows have a length given by ceiling (N), and the subsequent partial rows have a length given by floor (N), where N is given by the selected cycle divided by the block height of a matrix on a previous layer.

9. The method of claim 4, wherein the schedule assigns the initial blocks in the row-major order to fill a space defined by a diagonal in the matrix.

10. The method of claim 9, wherein switching the assignment direction occurs at the particular selected cycle.

11. The method of claim 1, wherein the accelerator has multiple tiles and each layer is to be computed by a respective tile of the multiple tiles.

12. The method of claim 1, wherein the accelerator has a single tile to perform operations of both layers.

13. A system comprising a processor, a non-transitory machine-readable storage device storing instructions that are executable by the processor to cause performance of operations comprising:

receiving a request to generate a schedule for a first layer of a program to be executed by an accelerator configured to perform matrix operations at least partially in parallel, wherein the program defines a plurality of layers including the first layer, each layer of the program defining matrix operations to be performed using a respective matrix of values;

assigning a plurality of initial blocks to the schedule according to an initial assignment direction, wherein the initial assignment direction in a row-major ordering or a column-major ordering specifies a first dimension of a first matrix for the first layer along which the plurality of initial blocks are to be performed;

selecting a particular cycle to process a last block of a matrix needed before a subsequent layer can begin processing;

switching the assignment direction from the row-major ordering to the column-major ordering, the switched assignment direction specifying a second dimension of the first matrix different to the first dimension so that any remaining unassigned blocks of the matrix that are processed after the selected particular cycle are processed along the different second dimension of the first matrix;

assigning to the schedule the remaining unassigned blocks according to the switched assignment direction; and sending the generated schedule to the accelerator for performing operations for processing the blocks of the first matrix of the current layer according to the generated schedule.

14. The system of claim 13, wherein selecting the particular cycle comprises:

computing the propagation latency of a previous layer, where the propagation latency is related to a number of cycles before the subsequent layer produces an output for use by the first layer in processing the last block; and assigning the particular cycle to the schedule of processing the last block of the plurality of initial blocks of the first matrix based on the propagation latency of the previous layer.

15. The system of claim 13, wherein selecting the particular cycle comprises:

computing the propagation latency of a previous layer;

computing a number of idle cycles of the previous layer; and selecting a maximum between the propagation latency of the previous layer and the number of idle cycles of the previous layer.

16. The system of claim 13, wherein the schedule assigns the plurality of initial blocks in row-major order, and wherein assigning all remaining unassigned blocks assigns blocks in column-major order.

17. The system of claim 16, further comprising selecting a cycle at which to switch the assignment direction including selecting a cycle at which a number of unscheduled rows is equal to a difference between a current cycle and the selected particular cycle.

18. The system of claim 16, wherein the schedule assigns the plurality of initial blocks along only partial rows of the matrix.

19. The system of claim 18, wherein the schedule assigns a plurality of initial partial rows and a plurality of subsequent partial rows, wherein the subsequent partial rows are smaller than the initial partial rows.

20. The system of claim 19, wherein the initial partial rows have a length given by ceiling (N), and the subsequent partial rows have a length given by floor (N), where N is given by the selected cycle divided by the block height of a matrix on a previous layer.

* * * * *